United States Patent
Partridge et al.

[11] Patent Number: 6,160,811
[45] Date of Patent: Dec. 12, 2000

[54] DATA PACKET ROUTER

[75] Inventors: Craig Partridge, El Cerrito, Calif.; Walter C. Milliken, Dover, N.H.

[73] Assignee: GTE Internetworking Incorporated, Cambridge, Mass.

[21] Appl. No.: 08/928,712

[22] Filed: Sep. 12, 1997

[51] Int. Cl.[7] .............................. H04L 12/28; H04L 12/56
[52] U.S. Cl. ............................................. 370/401; 370/359
[58] Field of Search ................................... 370/401, 229, 370/230, 231, 235, 351, 356, 360, 363, 366, 367, 389, 391, 392, 395, 396, 397, 398, 399, 409, 411, 359, 362, 400, 402, 419, 420, 422

[56] References Cited

U.S. PATENT DOCUMENTS

| | | | |
|---|---|---|---|
| 5,166,926 | 11/1992 | Cisneros et al. | 370/392 |
| 5,179,552 | 1/1993 | Chao | 370/398 |
| 5,438,566 | 8/1995 | Masetti et al. | 370/395 |
| 5,446,738 | 8/1995 | Kim et al. | 370/411 |
| 5,453,979 | 9/1995 | Schibler et al. | 370/395 |
| 5,550,816 | 8/1996 | Hardwick et al. | 370/401 |
| 5,566,170 | 10/1996 | Backke et al. | 370/392 |
| 5,608,719 | 3/1997 | Hyodo et al. | 370/395 |
| 5,610,912 | 3/1997 | Johnston | 370/359 |
| 5,734,649 | 3/1998 | Carvey et al. | 370/355 |
| 5,754,791 | 5/1998 | Dahlgren et al. | 370/400 |
| 5,757,795 | 5/1998 | Schnell | 370/392 |
| 5,796,715 | 8/1998 | Patterson et al. | 370/349 |
| 5,850,395 | 12/1998 | Hauer et al. | 370/398 |
| 5,859,788 | 1/1999 | Hou | 364/725.01 |
| 5,872,783 | 2/1999 | Chin | 370/392 |
| 5,892,923 | 4/1999 | Yasuda et al. | 709/239 |
| 5,905,723 | 5/1999 | Varghese et al. | 709/239 |
| 5,905,725 | 5/1999 | Sindhu et al. | 370/389 |
| 5,918,074 | 6/1999 | Wright et al. | 710/52 |
| 5,926,626 | 7/1999 | Takeuchi et al. | 309/249 |

*Primary Examiner*—Douglas W. Olms
*Assistant Examiner*—Phirin Sam
*Attorney, Agent, or Firm*—Leonard Charles Suchyta; Floyd E. Anderson; James K. Weixel

[57] ABSTRACT

The router disclosed herein employs a plurality of forwarding processors and a matrix switch for selectively connecting input ports, output ports and the forwarding processors. Each of the input ports includes means for selecting a respective forwarding processor for each incoming data packet in accordance with data in the respective packet header and for transmitting the packet header to the selected forwarding processor. The selected forwarding processor operates to transmit to the originating input port the identity of an output port appropriate for the packet's next hop.

13 Claims, 5 Drawing Sheets

DATA PACKET ROUTER

BACKGROUND OF THE INVENTION

The present invention relates generally to packet switched data handling systems and, more particularly, to a high speed router employing a crossbar type switch and multiple independent forwarding processors.

There is increasing interest in providing communications between disparate computer systems and even between networks of differing characteristics. Further, with the availability of very high bandwidth trunk lines, e.g., using fiber optic cables, there is increasing interest in combining traffic from a great variety of sources for transmission through a single trunk line or link. For wide area networks, packet switching technology is widely used where information to be transmitted is broken into packets of data which are preceded by headers containing information useful in routing. The header may also identify the source and the destination. Whether truly packet switched or not, most digital communication systems employ message formats in which there is an identifying header of some sort.

As is well known, data network usage is expanding at a great rate both in terms of private networks and also public networks such as the Internet. While transmission link bandwidths keep improving, the technology of the systems which interconnect the links has lagged behind. In particular, routers are needed which can keep up with the higher transmission link bandwidths. A high speed router needs to achieve three goals. First, it needs to have enough internal bandwidth to move packets between its input and output interfaces at the desired rates. Second, it needs enough packet processing power at the interfaces to forward the packets and, third, the router needs to be able to redirect the packets between possible paths at the requisite rates. Processing power available for making forwarding decisions is a resource which should be made available fairly and not be subject to hogging or malicious pre-emption.

Most currently available or conventional routers are bus based, that is, a high speed bus is provided which can link a single input to a single output at one time. The router of the present invention utilizes a crossbar switch type interconnection between inputs and outputs. While crossbar-type interconnection schemes have been utilized heretofore in various contexts, one problem which exists in the context of packet switching is the allocation of available paths through the crossbar. As is understood by those skilled in the art, only a limited number of switch points can be utilized at any one time since a single input should not be connected to more than one output at a given time and, likewise, each output should only be connected to a single input. A scheme for quickly and fairly allocating switch points in a cross-bar type of switch is disclosed and claimed in copending and coassigned application Ser. No. 08/656,546 entitled Data Packet Router and filed May 31, 1996 in the name of Philip P. Carvey et al. The disclosure of that application is incorporated herein by reference.

Among the several objects of the present invention may be noted the provision of a novel router architecture which provides flexible and protectable processing power for making forwarding decisions; the provision of such an architecture in which such processing power can be allocated fairly and can be protected from hogging or malicious pre-emption; the provision of such an architecture which allows a single router to be shared among several functionally independent and private networks, i.e. so-called virtual private networks; the provision of such a router architecture that can handle multigigabit data throughputs; the provision of such a router architecture which can accommodate data links of disparate types; the provision of such a router architecture which is highly reliable; the provision of such a router architecture which is easily maintained and which is highly reliable; the provision of such a router architecture which is of relatively simple and inexpensive construction in relation to its capabilities. Other objects and features will be in part apparent and in part pointed out hereinafter.

SUMMARY OF THE INVENTION

The router of the present invention employs a crossbar or matrix type switch to interconnect not only input port interfaces and output port interfaces but also a plurality of forwarding processors which can operate essentially independently of each other. An input port interface module selects a forwarding processor on the basis of data contained in the header portion of a received data packet. A condensed version of the header portion is transmitted to the selected forwarding processor which then identifies an appropriate output port and communicates that identity back to the input port interface module which can then establish a connection through the switch to the selected output port interface module.

In accordance with another aspect of the invention, link layer information embedded in the packet header, which typically varies in format from one type of data link to another, is abstracted into a common data format prior to being transmitted to the forwarding processor. The forwarding processor can then make next hop calculations without being concerned about the protocols of either the incoming data link or the outgoing data link. This abstraction simplifies programming of the forwarding processor and greatly speeds its operation.

In accordance with another aspect of the present invention, different routing tables are loaded into the different forwarding processors since the different forwarding processors can serve different, though possibly overlapping, portions of the overall network. This approach reduces the amount of high speed memory which must be provided to each forwarding processor and allows the processing power of each forwarding processor to be protected from utilization or attack by entities not included in that portion of the overall network serviced by the respective forwarding processor.

BRIEF DESCRIPTION OF THE DRAWINGS

Corresponding reference characters indicate corresponding parts throughout the several views of the drawings.

DESCRIPTION OF THE PREFERRED EMBODIMENT

Figure 1:
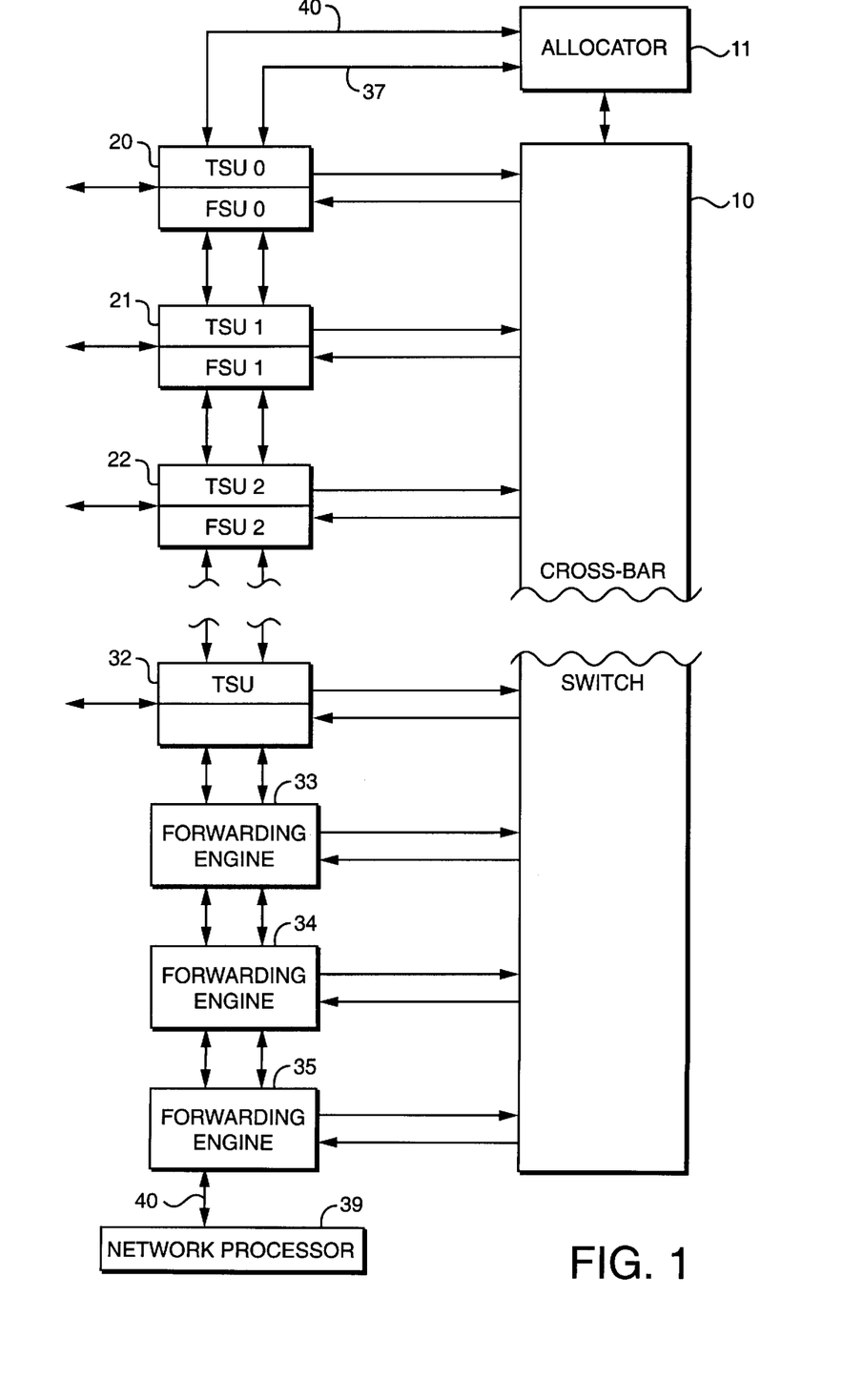
FIG. 1 is a block diagram of a data packet router in accordance with the present invention.

Referring now to FIG. 1 which illustrates the overall arrangement of a router according to the present invention, it can be seen that a crossbar switch, designated by reference character 10, interconnects a plurality of function cards or modules, designated by reference characters 20–35. The cross point connections making up the switch 10 are made available by the operation of an allocator 11 which is described in greater detail in aforementioned application Ser. No. 08/656,546.

In the particular embodiment being described by way of example, thirteen of the function cards (20–32) are line interface (LI) cards which provide high speed bi-directional data ports connecting network links or trunks to the router system, while the last three function cards (33–35) are so-called forwarding processors whose functioning is described hereinafter. These processor modules are also referred to herein as forwarding engines (FE). As will be understood, different mixes of card types may also be implemented.

Each of the port or line interface cards 20–32 can be considered as comprising both a to-switch-unit (TSU) and a from-switch-unit (FSU). In general, it is the function of the crossbar switch 10 to be able to connect any to-switch-unit (TSU) to any from-switch-unit (FSU) and to similarly connect input and output data paths on the forwarding engines 33–35. Data communications between the various components of the system of FIG. 1 which proceed through the crossbar switch 10 may be considered to be "fast path" communications. Accessing communications through the switch is requested by "bids" communicated through a separate set of connections with allocator 11 designated by reference character 37. The process by which "bid" obtain connections through switch is described in aforementioned application No. 08/656,546 and is not described in detail herein.

As is also described in the aforementioned application Ser. No. 08/656,546, the data port modules 20–32 may also operate to break up packets (which may be of variable length in some networks such as the Internet) into data pages of predetermined length so that the switch 10 can operate efficiently, sending a respective page of fixed length through each of multiple connections through the switch during a predetermined cycle of operations.

The router also includes a network processor 39. As in other, conventional routers, the network processor 39 is a general purpose programmed computer whose function is to manage the overall operation of the router in cooperation with other components of the overall network of which the respective router is a part, e.g. other routers, gateways and the transmission links themselves. The network processor may also handle certain "difficult" network packets which are not adaptable to the efficient forwarding scheme described herein.

The network processor 39 is connected to the forwarding engines (33–35), the port cards (20–32) and the allocator 11 through a bus, e.g. a conventional PCI (peripheral control interface) bus designated by reference character 40. The network processor 39 can itself send packets and receive data packets across the network through the forwarding engine 35 acting as an intermediary using the PCI bus. Data communications over the PCI bus may be considered to be "slow path" communications as compared with data communications going through the cross-bar switch matrix. Such "slow path" communications are mainly those used for setup, loading of data tables and the like.

Among its other functions the network processor 39 generates and loads into the forwarding engines 33–35 routing tables which define the correspondence between network packet addresses and the correspondingly appropriate connections through the crossbar switch 10. The principal purpose of each of the forwarding engines 32–35 is to read the headers of packets coming into a TSU from the outside world, i.e. the network, to update the header for transmission out of the router, and to provide to the respective TSU a data structure which identifies the output port to which the packets should be transmitted through the crossbar switch 10. The headers are sent to a selected forwarding engine by the receiving TSU which buffers the body or "payload" of the packet.

In accordance with one aspect of the present invention, the forwarding engines do not have to analyze the link layer information incorporated in the packet layer. Rather, each TSU modifies the header of each packet which it sends to a forwarding engine by abstracting the link layer data, which tends to be substantially different for each type of data link, and substituting a common, fixed length data format which is independent of either input or output link protocol peculiarities.

As indicated previously, the main function of each of the forwarding engines is to make so-called "next hop" determinations, i.e. to determine the data link through which the packet should be next sent. In making this determination, the forwarding engine utilizes a respective routing table which is loaded into its memory by the network processor 39. The routing table information is preferably complete as to the portion of the network topology which the forwarding engine is to serve. Data reflecting the determination made by the forwarding engine is then sent back to the particular TSU which sent the respective packet header.

The "next hop" determination is in one sense a simple set of tasks but is demanding in terms of speed and is preferably performed by a high speed microcomputer. In the preferred embodiment of the present invention, each of the forwarding engines employs an Alpha 21164 processor manufactured by the Digital Equipment Corporation of Maynard, Mass. Elements of the data structure given to the TSU may be considered as "bids", each of which identifies a data packet seeking to utilize a particular crossbar switch point.

By simplifying the processing which must be performed by the forwarding processors, i.e. by abstracting the link layer data, the main code and table of data needed for each forwarding engine can be held in the processor's on-chip high speed cache. As indicated previously, the architecture of the present invention using multiple forwarding processors means that each such processor needs only that routing table information which is relevant to its own operations which can be limited to a respective portion of the total network to which the overall router is connected.

As indicated previously, the network processor 39 conducts the overall management of the router. In accordance with one aspect of the present invention, it is only in the Network processor 39 that a routing table covering the entire network must be maintained. The network processor loads into each interface card a table of information which allows each TSU (to-switch unit) to identify those types of incoming packets or ATM cells which may arrive at that particular unit. The table of information downloaded from the network processor into the TSU also identifies, for each type of packet expected, a particular one of the forwarding engines which should make the next hop routing decisions for that particular type of packet. The table of information provided to the TSU also contains a translation table which allows the to-switch unit to abstract link level data and convert it to a common, fixed length data format which is independent of the peculiarities and protocol utilized by the particular type of data link connected to the to-switch unit.

The network processor 39 loads into the forwarding engines processors 33–35 only that routing table information which is necessary for the forwarding processor to handle packets which will be assigned to it by the various interface cards. As indicated previously, the principal task of each of the forwarding engines is merely to determine which output port (FSU) each incoming packet should be sent. In this regard, the forwarding engine or processor is similarly not concerned with the link layer protocols of the outgoing link or data trunk. Rather, the forwarding engine passes back to the to-switch unit (which has buffered the packet) a data structure which identifies the output port which is to be used for the next hop, together with flow control information. The TSU can then formulate a "bid" to the switch allocator 11 seeking connection to the FSU in the selected outgoing port. The processor in that FSU (from-switch-unit) is then tasked with creating a link level appropriate header suitable for transmission over the next link.

Figure 2:
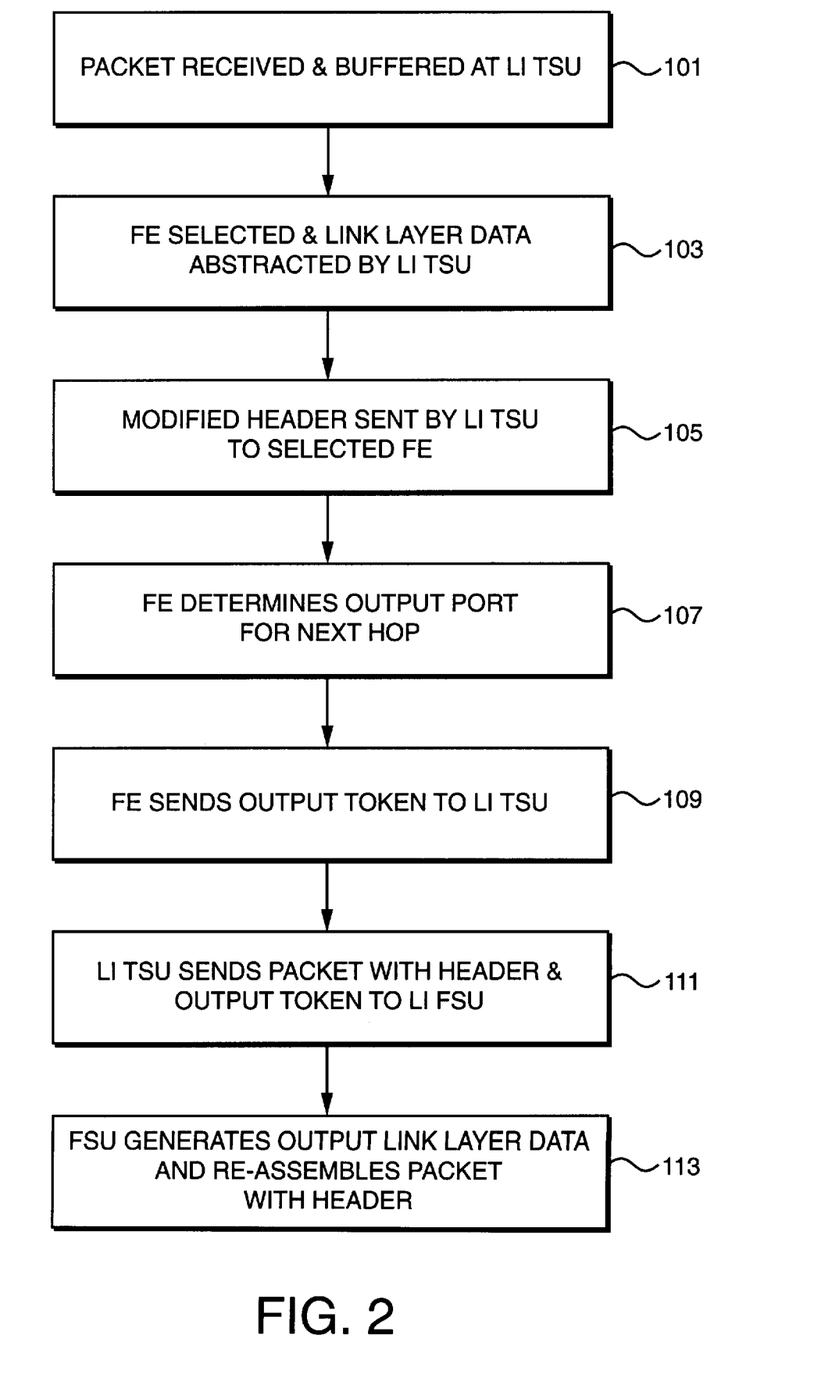
FIG. 2 is a flowchart illustrating operations performed in transferring a data packet from an input link to an output data link.

The basic process for handling and routing an incoming data packet is illustrated in FIG. 2. As indicated at block 101, a packet is received and buffered at the line interface to-switch unit (TSU). Using the data in the table downloaded to the TSU by the network processor, the TSU (1) selects a forwarding engine and (2) abstracts the link layer data in the header at block 103. As indicated at block 105, the modified header is sent by the TSU to the selected forwarding engine. As noted previously, this is a fast path communication through the crossbar switch 10.

The forwarding engine, using the respective routing table information downloaded to it by the network processor, determines the output port for the packet's next hop as indicated at block 107. Since this determination does not involve deciphering any of the link layer protocols, it can be performed relatively quickly as noted previously.

As indicated at block 109, the forwarding engine sends an output token back to the TSU which sent the packet header. Again, this is a fast-path data communication through the crossbar switch 10. As indicated at block 111, that to-switch unit then sends the entire packet with the header and the output token to the FSU (from-switch unit) determined by the forwarding engine. The FSU receiving the packet generates appropriate output link layer data and re-assembles the packet with header and transmits it over the data link chosen for the next hop 113.

Figure 3A:
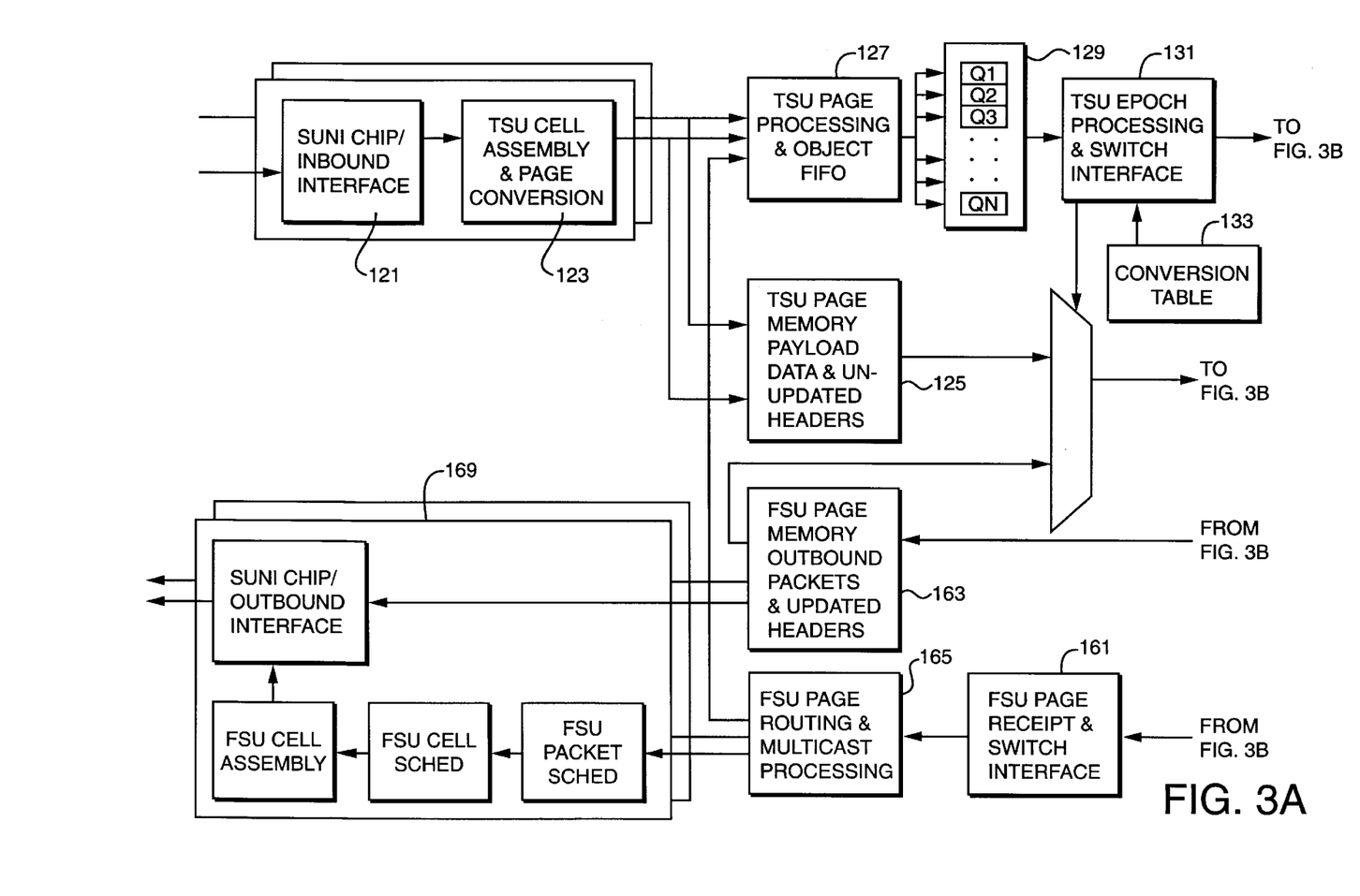
FIG. 3 is a block diagram illustrating the functionality and interaction between a line card and a forwarding engine employed in the router of FIG. 1.
Figure 3B:
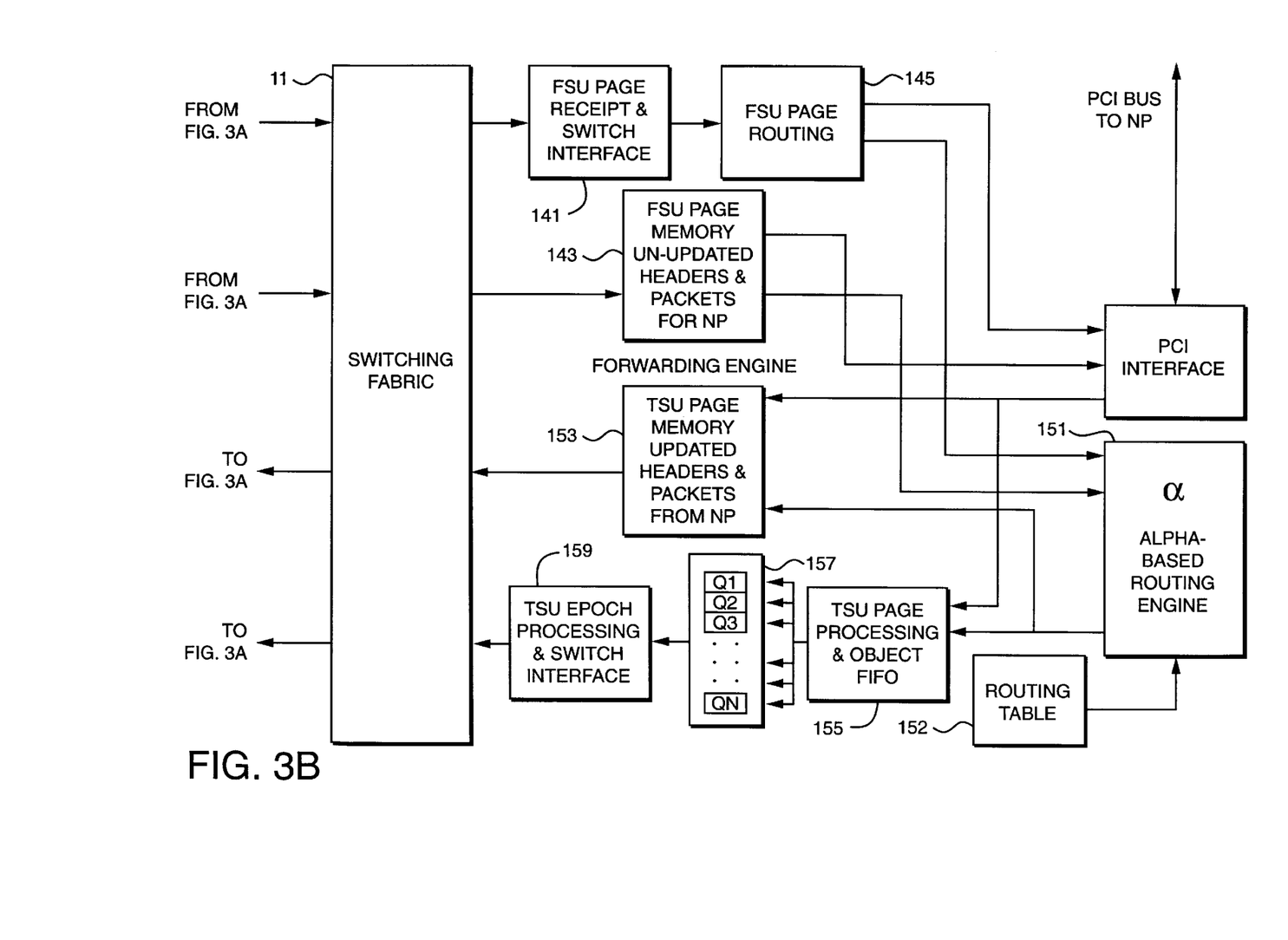

FIG. 3 illustrates in somewhat greater detail the functionality and interaction between a line interface card and a forwarding engine. While different functions in the line interface card are shown as separate blocks, it will be understood that multiple functions may in fact be performed by a suitably programmed microcomputer. Packets or ATM cells are received at a line interface 121 and, as indicated at block 123, are converted to data pages of length appropriate for transmission through the crossbar switch 10 as indicated previously. The data pages are written into a page memory 125 with the packet header at a known offset in the first page.

A data object representing the received packet is placed into a FIFO in a page processor 127. The page processor operates to place the data objects in appropriate queues, i.e. as indicated collectively at 129. Sequencing or so-called epoch processing and switch interface circuitry 131 arranges for the passage through the crossbar switch as is described in greater detail in copending application Ser. No. 08/656, 546. While the packet is yet unrouted, the page processor 127 places the object in a queue for a corresponding one of the forwarding engines. When the epoch processor 131 sends the header page to the selected forwarding engine, it accesses a conversion table 133 to abstract the header from a link level specific format to a common format as described previously and to select a respective forwarding engine.

FSU page receipt circuitry 141 in the forwarding engine causes the header page to be placed into FSU page memory 143 and notifies a FSU page router 145. Assuming the page includes a packet header as described previously, the FSU page router 145 sends the page to the alpha routing engine 151. The alpha routing engine reads the header and utilizes the respective routing table 152 provided to it by the network processor to update the header and to include data which identifies the destination line interface card, i.e. the outgoing port. The updated header is written to a TSU page memory 153 and a corresponding data object is placed into a FIFO in a TSU page processor 155. Processor 155 manages a series of queues 157 which are read out by TSU epoch processing and switch interface circuitry 159 which operates to feed pages from the queues through the switch as crosspoints are available.

Updated header packages are passed back from the forwarding engine, through the switch 11, to the source interface card. When such a page is received at the source card 125, FSU page receipt and switch circuitry 161, page routing circuitry 163 causes that data to be communicated back to the page processing circuitry 127 so that the updated header and payload can be fed back through the crossbar switch to the outgoing line interface card. The FSU page receipt circuitry on the source line card writes the updated header into the FSU page memory 163 and notifies the FSU page router 165 that an updated header (as opposed to a payload page) has been received. The TSU page processor 127 then en-queues a request for the switch to transmit the updated header and payload to the destination or outgoing line interface card. The TSU epoch processor 131 merges the updated header page from the FSU page memory 125 with the remaining payload pages and sends them to the switch. In the outgoing line interface card, the updated header and payload pages are collected in the FSU page memory 163 and then reassembled into packets or ATM cells and directed out through the link interface, designated generally by reference character 169, using the appropriate link level protocols.

The FSU page receipt circuitry on the destination line interface card (which may be a different line interface card than the source line card) assembles the pages in the FSU page memory and notifies the FSU page router 165. The FSU page router in turn notifies the appropriate link channel that the packet or ATM cell is available. If the packet is a multicast packet, the FSU page router would potentially notify more than one channel. Each channel performs packet self-scheduling and self-assembly on the outbound packets before sending them to the link interface. It is at this stage that the packet or ATM cell is put into a format appropriate for the outbound link interface.

Figure 4:
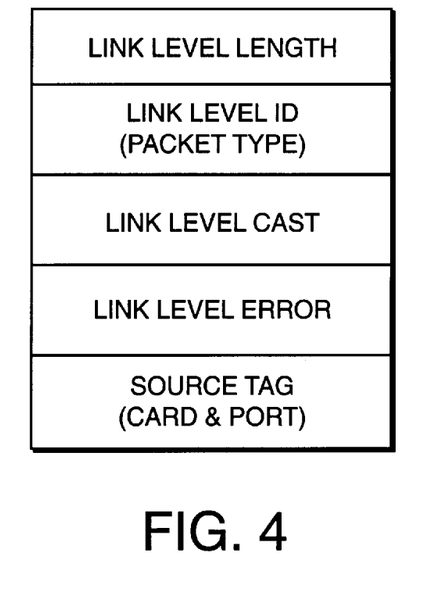
FIG. 4 is a diagram illustrating the format of an inbound abstract link level header employed in the interaction between a line card and a forwarding engine.

As indicated previously, the line interface cards transmit an abstracted header to the selected forwarding engine and the forwarding engine returns an updated abstracted header. The data fields in the inbound abstracted header are illustrated in FIG. 4. The link level length is the packet length. The link level i.d. is a 16-bit identifier that identifies the source address or VPI/VCI in the case of ATM cells. The link level type indicates the protocol in use, e.g. IPv4 or AppleTalk. Link level cast indicates if the link level destination is unicast, multicast or broadcast addresses. The link level error bit indicates an error was detected in processing the packet in the interface card. The source card and port indicate the originating interface, i.e. the line interface which received the packet/cell from the network and is originating it from the point of view of the forwarding engine.

By a way of example, Ethernet packets and ATM cells can be converted to this abstract link level header format. The Ethernet header comes in two forms. The first form contains a source and destination address (each six bytes) and an Ethernet type field. The length of the overall packet is determined by the interface when it successfully receives the packet. The second form of Ethernet header contains a source and destination address, length field and a type field. Both forms end the packet with a CRC (cyclic redundancy check). The abstract link level length is filled in with the length either from the interface determination in the first case or from the packet length field in the second case. The link level i.d. is set to a shorthand value for the Ethernet source address. The link level type is set according to the type contained in the Ethernet header. Ethernet addresses have unique ranges of values which determine if they are unicast, multicast or broadcast addresses. By parsing the address, the link level cast field can be set correspondingly. If the Ethernet CRC fails, the error bit is set. The source card and port numbers are generated by the interface card itself according to which physical interface port the packet arrived on.

For ATM cells, the situation is slightly different. For ATMs using standard AAL5, the packet contains a length and CRC. The address is inferred from the ATM virtual channel the packet is received on. The link level length is taken from the AAL5 packet while the link level i.d. is set to a shorthand value for the VPI/VCI. The type of packet cast, i.e. whether unicast, multicast or broadcast, is determined by the type of virtual channel (VC) the ATM packet arrived on, as is the link level type. The error bit is set if the AAL5 CRC fails. Again the source card port numbers are generated by the interface card itself.

Figure 5:
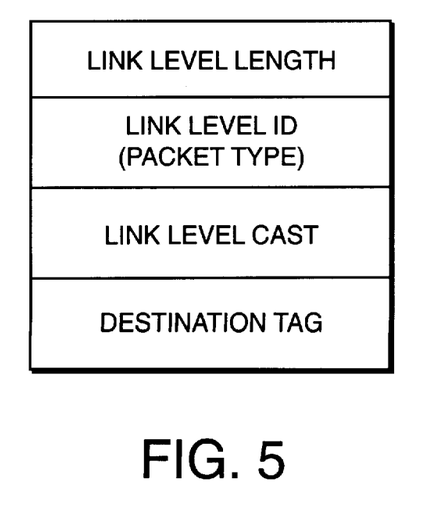
FIG. 5 is a diagram illustrating the format of an outbound abstract link level header employed in the interaction between a line card and a forwarding engine.

FIG. 5 illustrates the fields of the outbound abstract link level header which is generated by the forwarding engine and sent by the originating line interface to the destination or outgoing line interface card. The link level length is again the packet length. The destination tag is a 16-bit identifier indicating the outbound destination address or, in the case of ATM, BPI/VCI. The link level cast again indicates that this is multicast, broadcast or unicast. The error field again indicates if there is an error. The Mcast count is an indication of how many copies of the packet may be made, a parameter which is useful for buffer management on the outgoing interface. For Ethernet transmission the link level level length is made equal to the Ethernet length. The destination tag is used to access a table which contains the Ethernet destination address and the ports on the interface card out of which the packet is to be sent. The type field is used to set the Ethernet type and, again, the cast field is used to indicate if the packet is to be unicast, multicast or broadcast. The multicast count is useful for possible sharing of buffers on the outbound interface.

For ATM cell transmission, the link level length becomes the ATM AAL5 length. The destination tag determines the interface ports and ATM VCs (virtual circuits) to transmit on. The new link level type determines which type of link layer encapsulation to use, e.g. none, LLC/senAP or MARS, consistent with the VC properties. The multicast count is used for possible sharing of buffers on the outbound interface. In the embodiment illustrated, the error bit is currently ignored. As will be understood by those skilled in the art, other types of link level protocols may also be straightforwardly converted to an abstract link level header format which facilitates the straightforward operation of the selected forwarding engine. Other types of link level protocols include token ring, X.25, PPP (Point to Point Protocol).

By providing multiple, independent, forwarding processors which are separated from the data link interface modules, an architecture is provided in which forwarding processing power can be flexibly allocated. Input ports, as directed by the network processor can choose which forwarding engine to which a given received packet is to be sent. That resource can be protected from hogging or malicious utilization by packets from other sources. It is thus possible to set up multiple virtual private networks (VPNs) which are effectively protected from one another though they utilize common router hardware. This capability also allows network operators to provide an assured quality of service which is necessary for some customers.

The provision of multiple independent forwarding processors also means that each such processor need store and access only that information which is relevant to the part of the overall network which it is to service. This both simplifies and speeds actual operation of the forwarding processor as described in greater detail hereinbefore.

In accordance with another aspect of the invention, the forwarding processing is simplified and expedited by isolating the forwarding processor from considerations of link layer protocols by having the port modules abstract link layer data from the packet headers, the forwarding processor needs only to make the output port determination for the "next hop". Again the amount of code and data required for the forwarding processor is substantially reduced.

In view of the foregoing it may be seen that several objects of the present invention are achieved and other advantageous results have been attained.

As various changes could be made in the above constructions without departing from the scope of the invention, it should be understood that all matter contained in the above description or shown in the accompanying drawings shall be interpreted as illustrative and not in a limiting sense.

What is claimed is:

1. A router for directing data packets arriving on a plurality of input ports to output ports selected in accordance with information contained in headers attached to the packets, said router comprising:

a plurality of forwarding processors;

a switch for selectively connecting input ports, output ports and forwarding processors;

a plurality of input port interface modules, each of which includes means for selecting a respective forwarding processor for each incoming packet in accordance with data in a respective packet header and for transmitting the respective packet header to the respective forwarding processor, the selected forwarding processor being operative to transmit to the respective input port an identity of an output port appropriate for the incoming packet's next hop.

2. A router for directing data packets arriving on a plurality of input ports to output ports selected in accordance with information contained in headers attached to the packets, said router comprising:

a network processor for maintaining a routing table representing a network in which the router is operating;

a plurality of forwarding processors, each of which includes means for storing a selected portion of routing table data, constituting a complete routing table for a selected portion of network topology served by that forwarding processor;

a cross-bar switch selectively connecting input ports, output ports and forwarding processors; and a plurality of input port interface modules, each of which includes means for storing a data table loaded from said network processor and for selecting a respective forwarding processor for each incoming packet in accordance with data in a respective packet header and the data table and for transmitting the respective packet header to the selected forwarding processor through said cross-bar switch, the selected forwarding processor being operative to transmit through said cross-bar switch to a respective input port an identity of an output port appropriate for the incoming packet's next hop.

3. A router for directing data packets arriving on a plurality of input ports to output ports selected in accordance with information contained in headers attached to the packets, the headers including link layer data in a format which depends on the nature of a data link connected to the input port, said router comprising:

a plurality of forwarding processors;

a plurality of input port interface modules, each of which includes means:

for selecting a respective forwarding processor for each incoming packet in accordance with data in a respective packet header;

for abstracting link layer data to a uniform format and modifying the respective packet header correspondingly to form a modified packet header; and for transmitting the modified packet header to the selected forwarding processor, the selected forwarding processor being operative to transmit to a respective input port an identity of an output port appropriate for the incoming packet's next hop.

4. A router for directing data packets arriving on a plurality of input ports to output ports selected in accordance with information contained in headers attached to the packets, the headers including link layer data in a format which depends on the nature of a data link connected to an input port, said router comprising:

a network processor maintaining a routing table representing a network in which the router is operating;

a plurality of forwarding processors, each of which includes means for storing a selected portion of data in said routing table loaded from said network processor;

a cross-bar switch selectively connecting input ports, output ports and forwarding processors;

a plurality of input port interface modules, each of which includes means:

for storing a data table loaded from said network processor and containing data characterizing selected packet headers;

for selecting a respective forwarding processor for each incoming packet in accordance with data in said data table and a respective packet header;

for abstracting link layer data in the respective packet header to a uniform format and modifying the respective packet header correspondingly to form a modified packet header; and for transmitting the modified packet header to the selected forwarding processor through said cross-bar switch, the selected forwarding processor being operative to determine, from said selected routing table data portion and the respective packet header, a next network hop for the incoming packet and operative also to transmit through said cross-bar switch to a respective input port interface module an identity of an output port appropriate for the incoming packet's next hop.

5. In a dynamically reconfigurable packet switched network which comprises a plurality of routers coupled by data links and in which different users are entitled to utilize only selected ones of said links in accordance with respective virtual networks, a selectively configurable router which comprises:

a plurality of line interface units providing input ports and output ports for coupling data traffic to and from said selectively configurable router;

a plurality of forwarding processors, each of which incorporates a respective memory;

a switch selectively connecting input ports, output ports and forwarding processors;

a network processor storing network configuration information and virtual network information and operating to generate assignments of packets from different virtual networks to respective forwarding processors and storing a route table which defines possible paths through the selectively configurable router for each virtual network, said processor including means for providing to each of said plurality of forwarding processors a different subset of the route table, which subset corresponds to virtual networks assigned to a respective forwarding processor and utilizes only links authorized to respective virtual networks.

6. A router directing data packets arriving on a plurality of input ports to output ports selected in accordance with information contained in headers attached to the data packets, said router comprising:

a plurality of forwarding processors;

a switch to selectively connect input ports, output ports and forwarding processors;

a plurality of input port interface modules, each input port interface module receiving incoming packets from an input port, and selecting a respective forwarding processor for each incoming packet in accordance with data in a respective packet header, and transmitting information determined from the respective packet header to the respective forwarding processor through said switch; and the selected forwarding processor being operative to transmit through said switch, to a respective input port an identity of an output port appropriate for the incoming packet's next hop, based on the information determined from the respective packet header.

7. The new router of claim 6 wherein information determined from the respective packet header includes link layer data.

8. The router of claim 6 wherein information determined from the respective packet header is modified into a uniform format.

9. The router of claim 6 wherein each input port interface module includes a data table containing data characterizing selected packet headers, and the input port interface module selects a forwarding processor for each incoming packet in accordance with data in the data table and data in the respective packet header.

10. The router of claim 6 wherein each of said plurality of forwarding processors includes routing table data constituting a selected portion of a network topology served by a respective forwarding processor.

11. The router of claim 3 further comprising:

a plurality of output port interface modules including means for transforming the modified respective packet header and uniformly formatted link layer data into a link level appropriate header suitable for transmission over a next link.

12. The router of claim 4 further comprising:

a plurality of output port interface modules including means for transforming the modified respective packet header and uniformly formatted link layer data into a link level appropriate header suitable for transmission over a next link.

13. The router of claim 10 wherein the routing data table is held in a high speed cache.

* * * * *